United States Patent Office 3,392,132
Patented July 9, 1968

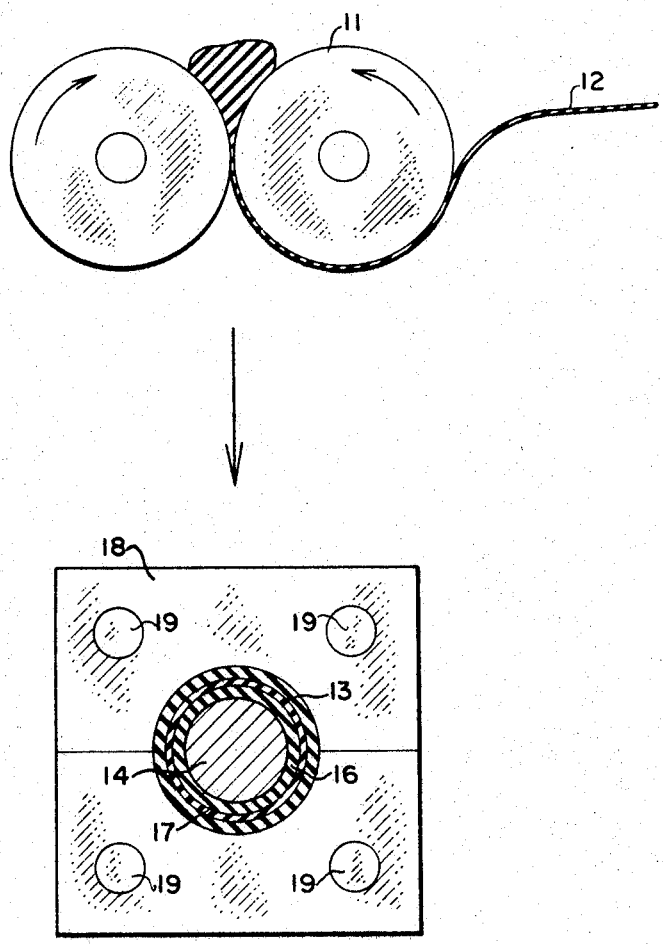
INVENTORS
RALPH G. D'ASCOLI
LEON L. ALLEVA
BY
THEIR AGENT

3,392,132
ADHESIVE COMPOSITION CONTAINING A COPOLYMER OF ETHYLENE AND ETHYL ACRYLATE AND PETROLEUM PITCH
Ralph G. D'Ascoli and Leon L. Alleva, Yonkers, N.Y., assignors to Anaconda Wire and Cable Company, a corporation of Delaware
Continuation-in-part of application Ser. No. 190,108, Apr. 25, 1962. This application May 2, 1966, Ser. No. 572,630
8 Claims. (Cl. 260—28.5)

ABSTRACT OF THE DISCLOSURE

An adhesive composition, bondable to polyethylene, comprises, typically, by weight, 100 parts of an ethylene-ethyl acrylate copolymer, 100 parts petroleum pitch, 20 parts chlorinated paraffin, 2 parts stabilizer and 100 parts clay filler.

This is a continuation-in-part of application Ser. No. 190,108, filed Apr. 25, 1962 and now abandoned.

Our invention relates to a composition that will adhere to a polyethylene surface and particularly such a composition comprised of the copolymer of ethylene and ethyl acrylate, petroleum pitch, and chlorinated paraffin and to a method of bonding with said composition.

In the splicing of electric cables where polyethylene is employed for insulation or jacketing, in repairing articles made of polyethylene; in forming tight seals around polyethylene cables or tubing and for other purposes which will be known to persons skilled in the relevant arts it has long been a problem to find a material that will form a bond to polyethylene surfaces.

We have invented a compound which forms a good bond to polyethylene surfaces and to other surfaces also, including metals such as aluminum, copper, brass and steel and other plastic and inorganic surfaces. Although our compound bonds to other materials its particular merit is its ability to bond to polyethylene, which is known to be relatively inert chemically and to have a smooth, waxy surface that has defied efforts to find a reliable bonding agent.

Our compound which is heat-bondable to polyethylene surfaces is comprised of 100 parts by weight of the copolymer of ethylene and ethyl acylate, 25–120 and preferably 100 parts by weight of petroleum pitch, 0–120 and preferably 100 parts by weight of filler, 0–50 and preferably 20 parts by weight of chlorinated paraffin wax, 0–20 parts by weight of polyethylene although we prefer to omit this element, and 0–5 parts, preferably 2 parts by weight of stabilizer. The copolymer of our composition comprises 5–35 weight percent and preferably 10–25 weight percent of ethyl acrylate and has a melt index of 1–9, and preferably 4.8–7.2.

It is a feature of our compound that it is free flowing at elevated temperatures below its decomposition point and can be used as a hot-melt adhesive for polyethylene.

We prefer the pitch of our composition to have a melting point of 35–215° F., preferably about 212° F.; a specific gravity of 1.04–1.17, preferably about 1.16; and a C.O.C. flash point of 335°–495° F., preferably about 490° F.

We have also invented a method of bonding two surfaces at least one of which may be polyethylene, comprising the steps of blending a compound comprising a copolymer of ethylene and 5–35 weight percent of ethyl acrylate, petroleum pitch, and chlorinated paraffin on a mill at a temperature of 200–350° F. sheeting the compound, interposing a strip of the sheeted compound between the surfaces to be bonded, and heating the compound to at least about 200° F.

Our method is shown diagrammatically in the figure of the drawing.

In the drawing the compound ingredients are added to a mill 11 from which they issue as a sheet 12.

In bonding a polyethylene sleeve 13 to a cable 14 with a polyethylene sheath 16, a strip 17 of the sheet 12 is wrapped around the sheath 16 and the cable with the strip around it is inserted into the sleeve. The assembly is heated by the mold 18 having heating elements 19 until the strip 17 reaches a temperature of at least 200° F. Thereafter when the cable is removed and permitted to cool, the sleeve 13 will be firmly bonded to the jacket 16 in a vapor-tight seal.

The material comprising our compound may be conveniently measured on the basis of 100 parts by weight of the copolymer. This is a copolymer of ethylene and ethyl acrylate. A commercially available copolymer that we have found suitable is known to commerce under the trade name Bakelite DPDB 6169 supplied by Union Carbide Plastics Company, 270 Park Avenue, New York, N.Y. 10017. Suitable copolymers have a weight percent of ethyl acrylate of 5–35 with a melt index of 1–9, and can be made in accordance with Patent 2,953,551. The preferred material DPDB 6169 has an ethyl acrylate content of 10–25 weight percent, a melt index of 6±20% and a density at mid-range of 0.931.

To 100 parts of the above copolymer we add on the mill from 0–120 parts by weight of filler such as #33 clay filler. We have found that 100 parts of clay filler forms a compound having the most desirable consistency.

From 0 to 50 parts of chlorinated paraffin such as Chlorowax 70 containing 70% chlorine supplied by the Diamond Alkali Co., 300 Union Commerce Bldg., Cleveland 14, Ohio are added to the mill. Although we prefer to add about 20 parts by weight of Chlorowax 70, we have found that an equal proportion of Chlorowax 40, supplied by the same company is also suitable. When chlorinated paraffin is used in our compound it is stabilized by the addition of as much as 5 parts, but preferably 2 parts, by weight of a suitable stabilizer such as basic lead silicate sulfate of which Tribase-E supplied by the National Lead Company, 111 Broadway, New York, N.Y. 10006 is a commercially available example, and this is added to the mill.

A further ingredient of our compound is 25–100 parts by weight of petroleum pitch. By "petroleum pitch" we refer to the pitch condensed from a petroleum cracking process such as that described in U.S. Patent 2,372,197. The pitch is a highly condensed polynuclear hydrocarbon of molecular weight in the range of about 500–600, with a low hydrogen to carbon ratio indicating it to be largely aromatic. A suitable pitch is known as "Transphalt" and is supplied by the Pennsylvania Industrial Chemical Corp., Clairton, Pa. We have found that Transphalt L–5 having a melting point of about 41° F., a C.O.C. flash point of about 340° F., a specific gravity of about 1.05 and an SSU viscosity at 210° F. of 121.3; Transphalt T–50 having a melting point of about 122° F., a C.O.C. flash point of about 400° F. and a specific gravity of about 1.09, and Transphalt T–100 having a melting point of about 212° F., a C.O.C. flash point of about 490° F. and a specific gravity of about 1.16 are suitable although we prefer to use the solid material melting at about 212° F.

Our compound may also include up to 20 parts by weight of polyethylene which has the effect of increasing the flow temperature.

The compound of our invention will not only bond well to polyethylene and other polyolefins such as polypropylene but also to metals and to other plastics such as rigid polyvinyls.

Example I

A compound was prepared by milling:

| | Parts by weight |
|---|---|
| Copolymer ethylene-ethyl acrylate (Bakelite DPDB 6169) | 100 |
| Petroleum pitch (Transphalt 100) | 100 |
| Chlorinated paraffin (Chlorowax 70) | 20 |
| Stabilizer (Tribase-E) | 2 |
| #33 clay filler | 100 |

A strip of this sheet was heated by a soldering iron, and was applied to two 1-inch-wide pieces of polyethylene which were overlapped for 1½ inches and held together at this point by bridging the compound ½ inch on both top and bottom pieces. A load of 94 pounds was required to sever the material, while showing no loss of bond to the polyethylene strips.

Example II

A ½-inch strip of compound from the sheet of Example I was wrapped around a polyethylene-sheathed cable 1 inch in diameter and inserted into a polyethylene sleeve. The sleeve was pressed down over the compound and heated to about 400° F. After cooling the sleeve was pulled from the cable in a testing machine. A load of 500 lbs. was required to sever the bond between the sleeve and the cable sheath.

We have invented a new and useful adhesive compound and method of preparing and using the same for which we desire an award of Letters Patent.

We claim:

1. A composition of matter heat bondable to polyethylene comprising:
    (A) 100 parts by weight of the copolymer of ethylene and ethyl acrylate,
        said copolymer comprising 5–35 weight percent of ethyl acrylate and having a melt index of 1–9,
    (B) 25–120 parts by weight of petroleum pitch which is a highly condensed polynuclear hydrocarbon with a low hydrogen to carbon ratio, and which has a melting point of 35°–215° F., a specific gravity of 1.04–1.17, and a C.O.C. flash point of 335°–495° F.,
    (C) 0–120 parts by weight of filler,
    (D) 0–50 parts by weight of chlorinated paraffin wax,
    (E) 0–20 parts by weight of polyethylene, and
    (F) 0–5 parts by weight of stabilizer.

2. The composition of claim 1 wherein said pitch has a melting point of about 212° F., a specific gravity of about 1.16 and a C.O.C. flash point of about 490° F.

3. The composition of claim 1 wherein said copolymer comprises 10–25 weight percent of ethyl acrylate and has a melt index of 4.8–7.2.

4. A composition of matter heat bondable to polyethylene comprising:
    (A) 100 parts by weight of the copolymer of ethylene and ethyl acrylate,
        said copolymer comprising 5–35 weight percent ethyl acrylate and having a melt index of 1–9,
    (B) about 100 parts by weight of petroleum pitch which is a highly condensed polynuclear hydrocarbon with a low hydrogen to carbon ratio, and which has a melting point of 35°–215° F., a specific gravity of 1.04–1.17, and a C.O.C. flash point of 335°–495° F.,
    (C) about 100 parts by weight of filler,
    (D) about 20 parts by weight of chlorinated paraffin wax,
    (E) about 2 parts by weight of stabilizer.

5. The composition of claim 4 wherein said pitch has a melting point of about 212° F., a specific gravity of about 1.16 and a C.O.C. flash point of about 490° F.

6. The composition of claim 4 wherein said copolymer comprises 10–25 weight percent of ethyl acrylate and has a melt index of 4.8–7.2.

7. The method of bonding two surfaces comprising the steps of:
    (A) blending a compound comprising a copolymer of ethylene and 5–35 weight percent of ethyl acrylate, petroleum pitch which is a highly condensed polynuclear hydrocarbon with a low hydrogen to carbon ratio, and which has a melting point of 35°–215° F., a specific gravity of 1.04–1.17, and a C.O.C. flash point of 335°–495° F., and chlorinated paraffin on a mill, at a temperature of 200°–350° F.,
    (B) sheeting said compound,
    (C) interposing a strip of said sheeted compound between the surfaces to be bonded,
    (D) heating said compound to at least about 200° F.

8. The method of claim 7 wherein at least one of said surfaces is polyethylene.

References Cited

UNITED STATES PATENTS

| | | | |
|---|---|---|---|
| 2,953,551 | 9/1960 | White | 260—86.7 |
| 3,169,360 | 2/1965 | Corrall et al. | 57—34 |
| 3,249,567 | 5/1966 | Vigneault | 260—28.5 |
| 3,303,149 | 2/1967 | Fink et al. | 260—28.5 |
| 3,322,706 | 5/1967 | McAninch | 260—28.5 |

FOREIGN PATENTS

| | | |
|---|---|---|
| 1,017,722 | 10/1957 | Germany. |
| 6410037 | 3/1965 | Netherlands. |

MORRIS LIEBMAN, *Primary Examiner.*

B. A. AMERNICK, *Assistant Examiner.*